Feb. 9, 1943.  W. CORDS  2,310,352
PISTON PACKING DEVICE
Filed April 22, 1940
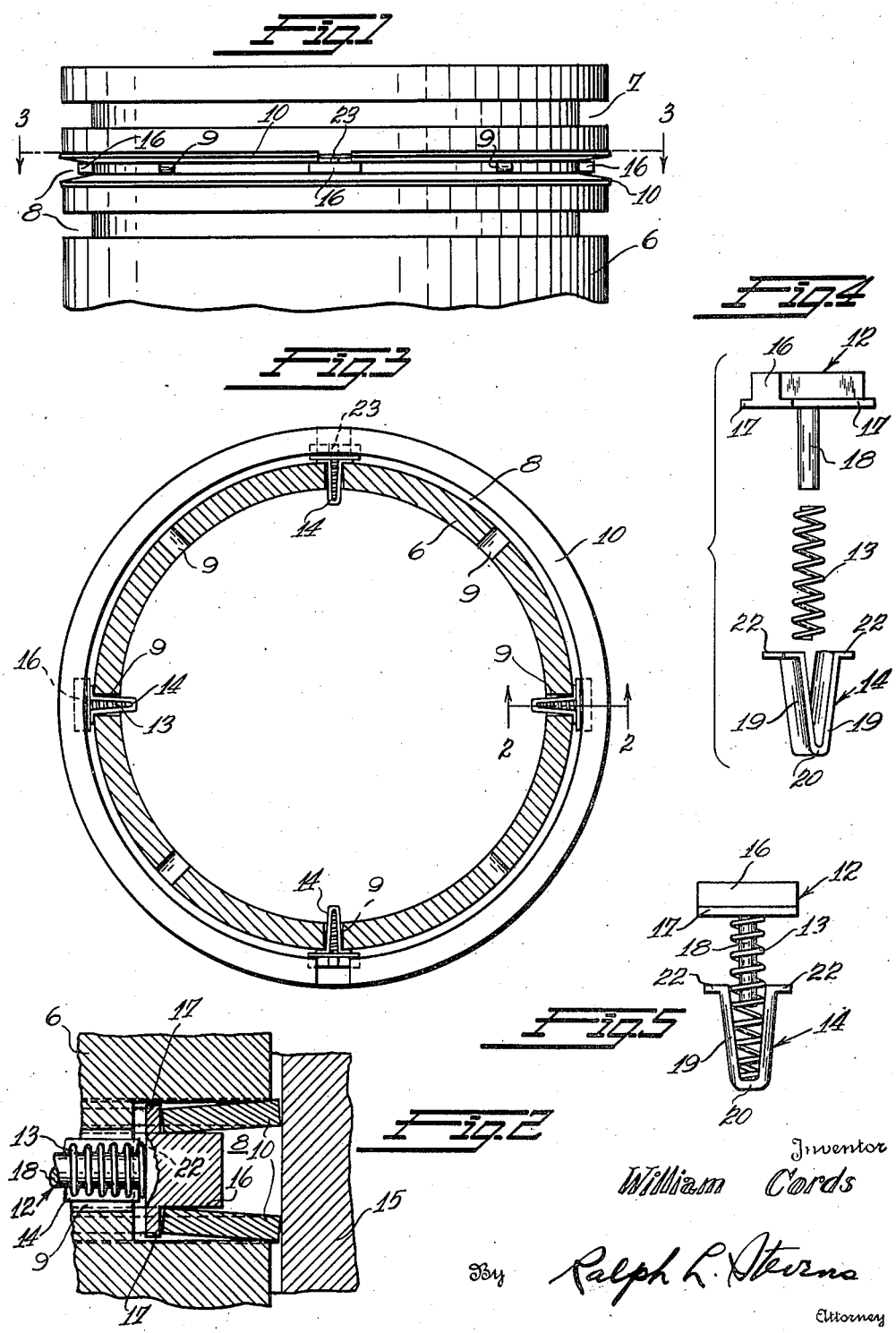
Inventor
William Cords
By Ralph L. Stearns
Attorney Patented Feb. 9, 1943

2,310,352

UNITED STATES PATENT OFFICE 2,310,352

PISTON PACKING DEVICE

William Cords, San Diego, Calif.

Application April 22, 1940, Serial No. 331,032

5 Claims. (Cl. 309—42)

The present invention relates to packing devices of the type designed to afford an annular seal between a pair of cylindrical surfaces which undergo relative reciprocation such, for example, as the surfaces of the plunger and cylinder of a motor or pump of the reciprocating type. The invention relates especially to packing ring assemblies useful particularly as seals for the pistons of internal combustion engines.

This invention constitutes, in the main, an improvement upon and a simplification of the ring assemblies of my copending application Ser. No. 191,791, filed Feb. 21, 1938, now Patent No. 2,231,801, issued Feb. 11, 1941, wherein there is disclosed a packing comprising one or more thin steel rings engaged along their inner edges by an expanding annulus that urges them radially outward against the cylinder bore. Such an expander is for the most part quite satisfactory but it must be made of relatively heavy stock and hence it can not be too highly compressed when inserting the piston in the cylinder without causing it to bear with excessive pressure against the sealing rings. A large range of radial expansion and contraction of an expander is desirable in order that the sealing rings will continue to contact the cylinder wall even after very substantial edge portions of the rings have been worn away. It also is desirable that the sealing rings throughout their life always exert a light sealing pressure against the cylinder; and in packing assemblies of the type under discussion it further is important that the expanding means does not materially restrict the free flow of oil through the piston drainage holes.

Accordingly, it is the primary object of the present invention to devise an improved form of expander that will meet the above requisites and that at the same time is of simple and cheap construction and easy to install.

One important subordinate feature of my invention resides in the provision of a plurality of short ring-engaging elements that are pressed outwardly by a plurality of springs. However, as will be understood as the description proceeds the ring-engaging elements may constitute a complete annulus pressed outwardly by the springs. Of greater importance is the design and arrangement of the springs with respect to the groove and the ring-engaging means.

It is an object of my invention to utilize long resilient springs that are not too highly compressed in use and that have a wide range of expansion and contraction. To this end I propose to extend said springs inwardly into or through the piston (preferably through the oil drainage holes of the piston). Where the springs pass completely through the piston it is a further object to so design them and their retaining means that they will permit the free passage of oil through their surrounding holes.

Another object of this invention resides in the design of the expanding means to cause the sealing ring to contact fully and uniformly throughout its circumference with the cylinder bore.

Still another object of my invention is to provide means on the expanding element or elements to prevent such rotation of split sealing rings as would bring their gaps into alignment.

The foregoing and other additional objects of the present invention will clearly appear from a study of the following detailed description when taken in conjunction with the accompanying drawing and the appended claims. In said drawing:

Fig. 1 is a fragmentary view in side elevation of a piston having a preferred form of ring assembly of the present invention adapted to one of its grooves.

Fig. 2 represents an enlarged fragmentary view, in section, of the piston and packing assembly of Fig. 1 shown in association with a cylinder, the section through the ring assembly being taken substantially along the plane of line 2—2 in Fig. 3.

Fig. 3 is a horizontal sectional view taken substantially on the plane of line 3—3 in Fig. 1.

Fig. 4 is an "exploded" view, in perspective, of the several elements comprising one of the ring expanding units of Figs. 1 to 3.

Fig. 5 is a side elevational view of an assembly of the elements seen in Fig. 4.

With continued reference to the drawing, wherein like characters are employed to designate like parts, the numeral 6 indicates a conventional piston having a top groove 7 designed to receive the usual firing ring (not shown), and one or more additional grooves 8 at least one of which is packed with the ring assembly of the present invention. As seen in Figs. 1 to 3, the packed groove is in communication with the interior of the piston by way of a plurality of oil drainage holes 9. These holes play an important part in the present invention, which is as follows.

The illustrated packing comprises a pair of sealing and wiping rings 10, and several detachable expander units each consisting of a ring separating and engaging element 12, an expanding spring 13 and a reaction socket 14 that is fitted detachably to one of the holes 9. The rings consist of thin annular split segments, dished (frustro-conical) as disclosed in my Patent No. 2,091,947, but they may be flat or undished and each may embody more than one convolution of the thin steel material. Also, a single ring may be used at one side only of the groove in which event the separating portion of the element 12 will be modified to give it greater width. These rings preferably are made materially greater in outside diameter than the piston so as to be compressed somewhat by the bore of a cylinder 15 (Fig. 2) when inserted therein, but they may be made to substantially the same diameter and the expander units may then be relied upon to press the rings against the cylinder wall. In either event a light sealing pressure is exerted uniformly radially against the bore.

Each element 12 comprises a ring-separating body portion 16 having lateral flanges 17 that engage the inner edges of the rings, and a guiding stem 18 that projects loosely into the coil spring 13. The stem may be formed integral with the body, or may be permanently united thereto or it may be simply projected detachably into a socket in the body. If the body is short, as shown, it may be straight but if it is made considerably longer it will require a curvature corresponding at least roughly to that of the groove bottom. It may be even shorter than shown or it may comprise an integral part of a complete annulus. It may be cut from strip material such as a straight rail or coiled rolled steel. Any materials that will withstand operating conditions can be used for the parts of the expander units.

The reaction socket 14 preferably is pressed from thin sheet metal and comprises a pair of integral straight legs 19 joined together at one end by a bridge 20 and having wings 22 at the other end which seat against the bottom of the piston groove. The legs 19 preferably have a cylindrical curvature so that they conform to the shape of the spring 13 where they approach it at opposite sides and thus avoid any possibility of the spring slipping out of the assembly. The bridge 20 serves as a reaction seat for one end of the spring and the adjacent portions of the legs 19 tend to grip this spring end. The other end of the spring must be able to move freely between the legs, and to facilitate this free action, as well as to assist in maintaining the sockets 14 in the drain holes during assembly and repair, the sockets may be made spring-like with an inherent tendency to assume a V-shape as in Figs. 4 and 5. Then, when assembled, the free ends of the legs will engage the outer ends of the drain holes.

The coil springs 13, and therefore the sockets 14 must have sufficient length to allow a considerable compression of the springs without creation of excessive radial forces against the sealing rings; and for this same reason, as well as for another reason presently to be seen, the springs must have substantial pitch. The outer ends of the springs may be fastened to the separators 12 in any suitable manner, if desired, so that each expander unit will form an assembly the elements of which will not too readily come apart. For that matter the stems 18 might be eliminated entirely by screwing the outer ends of the springs rather tightly into tapped holes in the separator bodies.

When a plurality of rings are utilized in each groove one side of each of certain of the separator bodies 16 preferably is provided with means extending into a ring gap to prevent rotation of the ring. In the illustrated form each of two diametrically opposed bodies 16 has a nub 23 formed integral therewith or attached thereto for this purpose, each nub projecting laterally into a ring gap and thus preventing the gaps of the two rings from aligning with or closely approaching each other to permit "blow-by."

The material of the ring segments is of less width than the groove depth and the flanges 17 are sufficiently thin to afford a substantial clearance between the flanges 17 and the socket wings 22.

The number of expander units may vary and it may correspond exactly with the number of drainage holes of the piston. Exact correspondence is permitted because the units do not block the holes—oil readily and freely passing through the only partially compressed springs and thence freely in lateral directions through the wide spaces or gaps between the pairs of socket legs 19. Conceivably as few as two diametrically opposed expander units will effectively and uniformly press the rings outwardly, or there may be evenly spaced groups of three, four (as illustrated) or a multiplicity.

In assembling the packing devices the units of Fig. 5 are simply pressed into the holes selected, and the rings 10 then are snapped into position to engage the shoulders 17 and (in some instances, depending upon the ring diameter) to slightly compress the springs 13. Upon insertion of the packed piston in its cylinder the rings are slightly compressed and thus cause a further compression of the coil springs.

In operation, the piston rings effect a seal, and they wipe some oil into the groove where it could become trapped were it not for the free drainage afforded through the holes 9 and the expander units carried therein. The general operation is similar to that of similar packings of this type in the patented art and in commercial use, but by the simple arrangement of the present invention more perfect drainage and more complete and uniform contact, circumferentially, is obtained between the rings and the cylinder wall.

It will be appreciated that various modifications in the illustrated details and arrangements may be made within the scope of my invention. Therefore I wish it understood that the invention is not confined to the specific disclosure herein made but is to be limited in the usual manner only by liberal interpretation of the appended claims in the light of the prior art.

I claim as my invention:

1. An expander unit assembly for association with the oil drainage hole of a hollow piston or the like, said assembly comprising an elongated coil spring, a socket for reception of said spring and designed to project into said hole and shaped to frictionally hold the inner end of said spring, and means at the outer end of said spring designed to be thrust radially outward by the latter and shaped to engage the inner edge of a packing ring.

2. In combination with a piston having at least one groove to be packed, packing means comprising at least one expansible and contractible ring disposed in said groove, said piston having a plurality of radial holes carrying compression springs, a plurality of sockets carried by said piston with spring abutments adjacent the inner ends of said holes, the sockets being designed to permit full and free oil drainage from said groove to the interior of said piston, said compression springs having relatively large pitch, and means disposed between said springs and said packing means to thrust the latter radially outwardly, said means being constructed and arranged to permit free flow of oil into said holes.

3. In combination with a cylindrical member having an annular groove to be packed; a pair of sealing rings split to form gaps permitting expansion and contraction, disposed in said groove and having a total width materially less than the width of said groove; reaction means comprising a plurality of relatively short and straight segments, T-shaped in cross-section, having flanges engaging the adjacent edges of said rings to urge them unto sealing position and having a separating portion secured against movement circumferentially of the groove and extending into the space between said rings; and means rigidly carried by said separating portion for projection into said gaps to prevent rotation of said rings.

4. In combination with a hollow or recessed plunger having an annular outer groove to be packed and having a plurality of oil drainage holes extending from said groove to the interior of said plunger, packing means disposed in said groove, a plurality of compressed springs arranged between said packing means and the interior of said plunger and extending through and slightly beyond said holes and means carried by said plunger to form individual receptacles constituting reaction abutments for the inner portions of said springs, said reaction abutments being sufficiently open to permit free oil drainage and comprising a plurality of substantially V-shaped devices receiving said springs and frictionally gripping the inner ends thereof.

5. In combination with a hollow or recessed plunger having an annular outer groove to be packed and having a plurality of oil drainage holes extending from said groove to the interior of said plunger, packing means disposed in said groove, a plurality of compressed springs arranged between said packing means and the interior of said plunger and extending through and slightly beyond said holes and means carried by said plunger to form individual receptacles constituting reaction abutments for the inner portions of said springs, said reaction abutments comprising substantially U-shaped resilient detachable devices having legs that are pressed into frictional engagement with the outer edges of said holes and having wings seated upon the groove bottom.

WILLIAM CORDS.